(12) United States Patent
Lu

(10) Patent No.: US 6,174,057 B1
(45) Date of Patent: Jan. 16, 2001

(54) SPECTACLE FRAME HAVING LENS DETACHABLY SECURING DEVICE

(76) Inventor: Shih Yao Lu, No. 20, Sec. 4, San Her Road, San Chong, Taipei Hsien, 241 (TW)

(*) Notice: Under 35 U.S.C. 154(b), the term of this patent shall be extended for 0 days.

(21) Appl. No.: 09/466,858

(22) Filed: Dec. 17, 1999

(51) Int. Cl.[7] .................................. G02C 1/08; G02C 5/22
(52) U.S. Cl. .............................. 351/90; 351/99; 351/153; 16/228
(58) Field of Search ............................. 351/90–102, 124, 351/133, 135, 153; 16/228

(56) References Cited

U.S. PATENT DOCUMENTS 2,551,144 * 5/1951 Lindemann et al. .................... 351/98
5,940,164 * 8/1999 Deppi .................................... 351/100
5,956,116 * 9/1999 Ishiyama ............................... 351/90

* cited by examiner

*Primary Examiner*—Huy Mai
(74) *Attorney, Agent, or Firm*—Charles E. Baxley

(57) ABSTRACT

A spectacle frame includes one or more frame members for receiving lenses and having an intermediate bridge portion and each having a temple portion. The bridge portion and the temple portions each has or each is formed with a pair of extensions. A clamping device is engaged onto or pivotally coupled to each pair of extensions for forcing the extensions toward each other and to retain the lenses within the frame members. The lenses may be engaged easily into or disengaged from the frame members when the clamping devices are disengaged from the extensions.

11 Claims, 2 Drawing Sheets

SPECTACLE FRAME HAVING LENS DETACHABLY SECURING DEVICE

BACKGROUND OF THE INVENTION

1. Field of the Invention

The present invention relates to a spectacle frame for detachably securing lens to the spectacle frame.

2. Description of the Prior Art

Typical spectacle frames comprise one or more frame members for retaining lenses therein. The frame members normally include a solid structure such that the lenses have to be forced into the frame members and such that the frame members may be damaged if the lenses are engaged into and disengaged from the frame members frequently.

The present invention has arisen to mitigate and/or obviate the afore-described disadvantages of the conventional spectacle frames.

SUMMARY OF THE INVENTION

The primary objective of the present invention is to provide a spectacle frame including a structure or a device for easily and detachably securing the lenses to the spectacle frame without additional tools.

In accordance with one aspect of the invention, there is provided a spectacle frame comprising one or more frame members including a bridge portion and each including a space and a temple portion, and one or more lenses received in the spaces of the frame members. The frame member includes a pair of temple extensions extended rearwardly of each of the temple portions and/or extended inwardly of the bridge portion. One or more clamping devices are engaged onto the pair of temple extensions for forcing the pair of temple extensions toward each other to retain the lenses within the frame member such that the lenses may be easily and quickly engaged into or disengaged from the frame members when the clamping devices are disengaged from the temple extensions.

The temple portions of the frame members each includes a coupling portion provided therein, the spectacle frame further includes a pair of legs pivotally coupled to the coupling portions of the frame members at a pivot pin respectively.

One or two latches are pivotally secured to the respectively temple portions of the frame members and having the clamping devices provided thereon. Each of clamping devices includes a pair of spring blades engaged onto the pair of temple extensions to force the pair of temple extensions toward each other. Each of the spring blades includes a projection extended therefrom for engaging with the pair of temple extensions and each includes an outwardly inclined fin extended therefrom for facilitating engagement of the pair of temple extensions into the clamping device.

Each of the lenses includes a peripheral groove formed therein, the frame member is formed with a wire and is engaged in the peripheral groove of each of the lenses for securing each of the lenses in its respective frame member.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
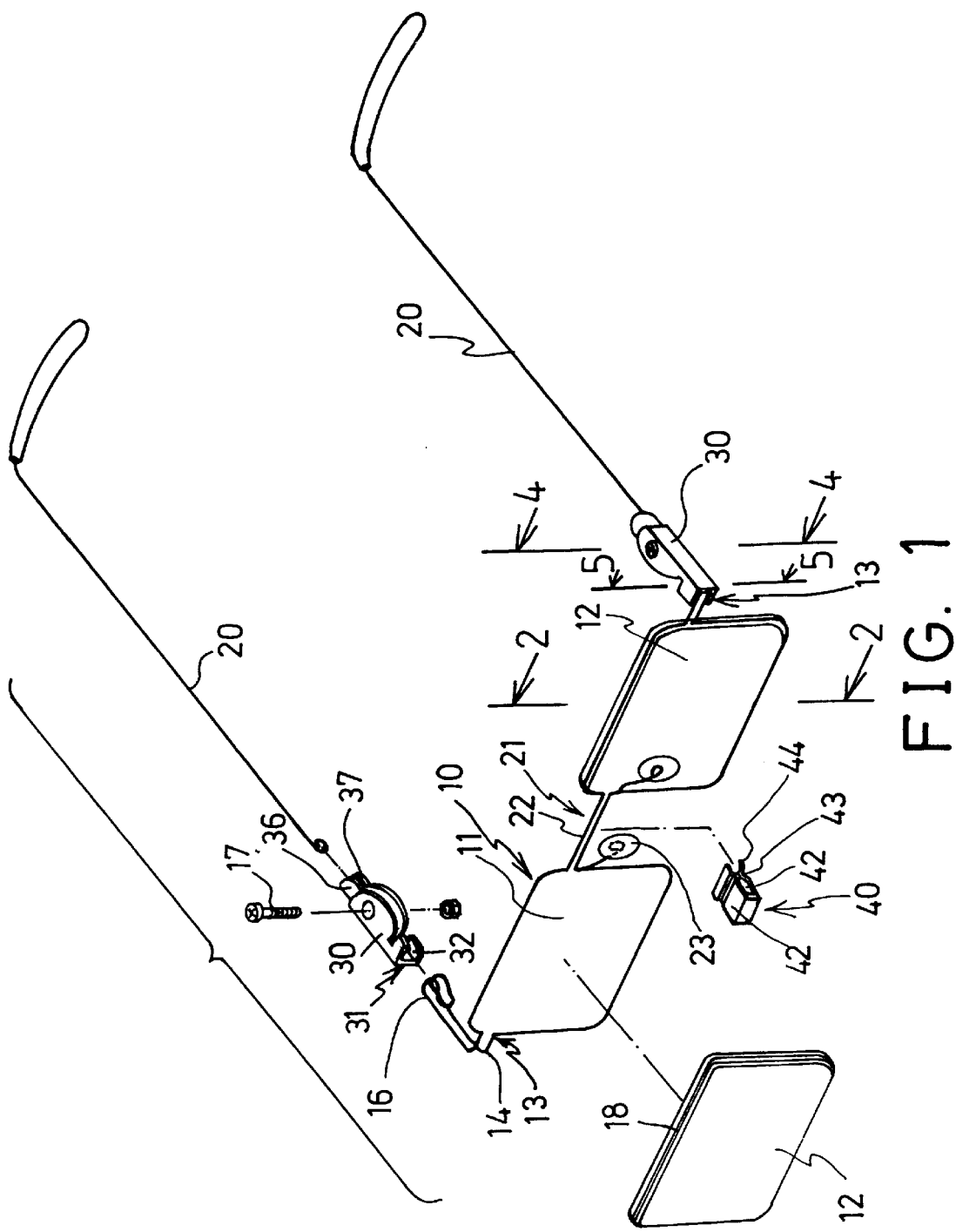
FIG. 1 is a partial exploded view of a spectacle frame in accordance with the present invention.
Figures 2, 3:
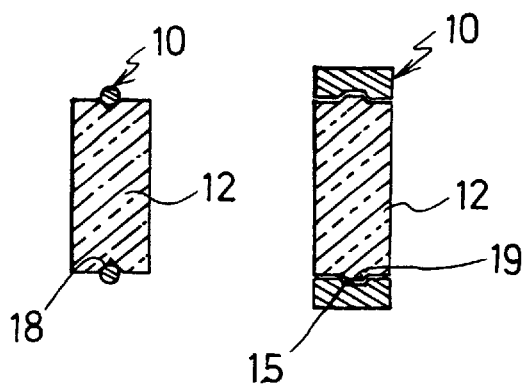
FIG. 2 is a cross sectional view taken along lines 2—2 of FIG. 1.
FIG. 3 is a cross sectional view similar to FIG. 2, illustrating the other application of the spectacle frame.

Referring to the drawings, and initially to FIG. 1, a spectacle frame in accordance with the present invention comprises one or more frame members 10, such as one or a pair of frame members 10 each having a space 11 formed therein for receiving a lens 12. As shown in FIG. 2, the lens 12 may include a peripheral groove 18 formed therein for receiving the frame members 10 which may be formed or shaped with wires or cables, and for solidly securing the lenses 12 within the frame members 10 respectively. Alternatively, as shown in FIG. 3, the frame members 10 may include a molded structure and each may include an inner peripheral recess 15 formed therein for receiving a peripheral bulge 19 of the lens 12 such that the lenses 12 also may be solidly secured in the frame members 10 respectively.

Figure 4:
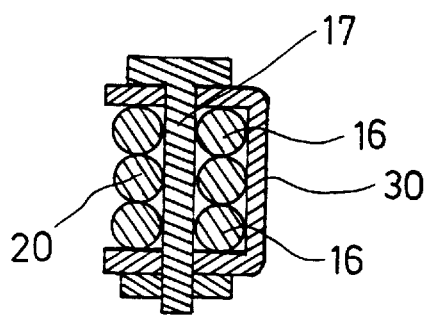
FIGS. 4 and 5 are cross sectional views taken along lines 4—4 and 5—5 of FIG. 1 respectively.
Figure 6:
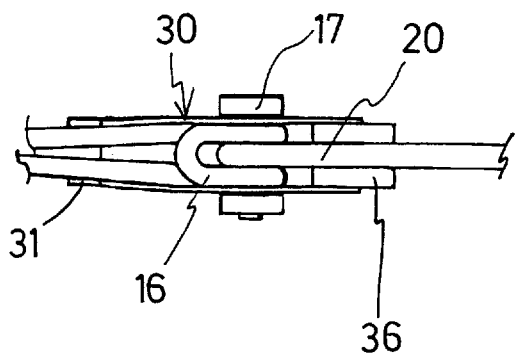
FIG. 6 is a partial plane view illustrating the pivotal coupling of the temple leg to the temple extensions of the spectacle frame.

Each frame members 10 includes a temple portion 13 and each includes a pair of temple extensions 14 extended projecting rearwardly from the temple portion 13. Each of the temple portions 13 of the frame members 10 includes a loop or a similar coupling portion 16 provided therein for receiving a pin 17 or a similar fastener. A pair of legs 20 each includes one end pivotally coupled to one of the respective temple portions 13 of the frame members 10 at the coupling portions 16 with the pivot pins 17 respectively (FIGS. 4, 6). When the spectacle frame includes two frame members 10, a bridge portion 21 is formed and provided between the frame members 10. Each of the frame members 10 includes a pair of extensions 22 extended inward of the bridge portion 21 for forming or defining the bridge portion 21 thereof; Or, the bridge portion 21 includes a pair of bridge extensions 22 coupled between the frame members 10 and parallel each to the other. A nose pad 23 may be coupled to the frame members 10 or to the bridge extensions 22.

Figure 5:
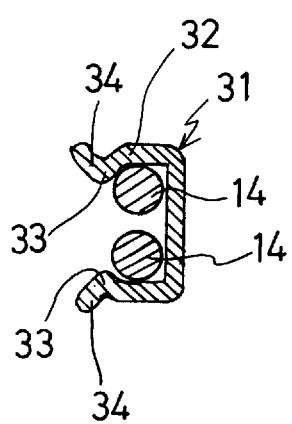

The present invention further includes one or a pair of latches 30 pivotally secured to the temple portions 13 at the pivot pin 17 (FIG. 4) and each having a clamping device 31 formed or defined by a pair of spring blades 32 for engaging onto the temple extensions 14 and for clamping or forcing the temple extensions 14 toward each other (FIG. 5) in order to clamp and retain the lens 12 within the respective frame members 10. It is preferable that each of the spring blades 32 includes a projection 33 extended inward therefrom for retaining the temple extensions 14 in the latch 30 and each includes outwardly inclined fins 34 for facilitating engagement of the temple extensions 14 into the respective latch 30. Each of the latches 30 may include a retainer 36 secured thereto or provided therein and having a slot 37 formed therein for receiving the end portion of the leg 20 and for retaining the leg 20 in place and for preventing the leg 20 from moving relative to the pivot pin 17.

In operation, the pivot pin 17 of the latch 30 may be rotated and the clamp 31 engaged or disengaged from the temple extensions 14 such that the lenses 12 may be easily engaged into or disengaged from the frame members 10 respectively. The clamping devices 31 of the latches 30 may be engaged onto the temple extensions 14 to force the temple extensions 14 toward each other and to clamp or retain the lenses 12 within the respective frame members 10.

The present invention further includes a clamping device 40 formed or defined by a pair of spring blades 42 for engaging onto the bridge extensions 22 and for clamping or forcing the bridge extensions 22 toward each other in order to clamp and retain the lens 12 within the respective frame members 10. It is also preferable that the spring blades 42 each includes a projection 43 extended inward therefrom for retaining the bridge extensions 22 in the clamping device 40 and each includes an outwardly inclined fins 44 for facilitating the engagement of the bridge extensions 22 into the respective clamping device 40 and/or for disengaging the clamping device 40 from the bridge extensions 22. In operation, the clamping device 40 may be disengaged selectively from the bridge extensions 22 such that the lenses 12 may be easily engaged into or disengaged from the frame members 10 respectively. The clamping device 40 may then be engaged onto the bridge extensions 22 to force the extensions 22 toward each other and to clamp or retain the lenses 12 within the respective frame members 10.

It is to be noted that the spectacle frame may include a single frame member 10 having the extensions 14 extended in the temple portion 13 thereof and may include a single latch 30 for forcing the temple extensions 14 toward each other. In addition, the latch(es) 30 may be separated from the frame members 10 similar to the clamping device 40 and may also be used to force the temple extensions 14 toward each other. When the spectacle frame includes a pair of frame members 10 having the pair of bridge extensions 22 provided between the frame members 10, a single clamping device 40 may be provided to force the bridge extensions 22 toward each other and to retain the lenses 12 within the frame members 10 respectively. In this situation, the temple portions 13 may include a solid structure having no parallel temple extensions 14 provided therein.

Accordingly, the spectacle frame pursuant to the present invention includes a structure or a device for easily and detachably securing the lenses to the spectacle frame without additional tools.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A spectacle frame comprising:

a frame member made of wire and arranged in a generally planar configuration and including a lens space, a lens removably positionable in the lens space and engageable by the frame member;

the frame member forming a first temple extension and a second temple extension each projecting rearwardly together, the first temple extension forming a first temple loop at its rearward end and the second temple extension forming a second temple loop at the rearward end;

a leg provided at its forward end with a leg loop;

a latch with a removable pin for penetrating through one of the temple loops, then through the leg loop, then through the other of the temple loops;

the latch including an engageable and releasable clamp to removably receive and control distance between the first temple extension and the second temple extension so as to secure or release the frame member to or from the lens.

2. The spectacle frame as claimed in claim 1, with the rearward ends of the first and second temple extensions being a continuous wire.

3. The spectacle frame as claimed in claim 1, wherein the clamp is provided with a pair of spring blades.

4. The spectacle frame as claimed in claim 3, wherein each of the spring blades includes a projection extended therefrom for retaining the temple extensions in the clamps.

5. The spectacle frame as claimed in claim 3, wherein each of the spring blades includes an outwardly opening fin extended therefrom for facilitating engagement of the temple extensions into the clamp.

6. The spectacle frame as claimed in claim 1, wherein the lens includes a peripheral groove formed therein, the frame member engageable in the peripheral groove for securing the lens in the frame member.

7. A spectacle frame comprising:

a pair of frame members including a bridge portion provided therebetween, and each of said frame members including a space formed therein, and each of said frame members including a temple portion provided therein;

a pair of lenses received in said spaces of said pair of frame members respectively;

said frame members including a pair of bridge extensions extended and provided in said bridge portion thereof for defining said bridge portion, and each including a pair of temple extensions extended from and provided in each of said temple portions thereof for defining each of said temple portions;

a pair of legs pivotally coupled to said temple portions of said frame members respectively;

a latch rotatably secured to each said temple portion of said at least one frame member at a pivot pin, said latch including a clamping device provided thereon for engaging onto said pair of temple extensions for forcing said pair of temple extensions toward each other and for retaining said lens within said at least one frame member; and forcing means for forcing said pair of bridge extensions toward each other to retain said lenses within said frame members respectively.

8. The spectacle frame as claimed in claim 7, wherein said forcing means includes a clamping device engaged onto said pair of bridge extensions and to force said pair of bridge extensions toward each other.

9. The spectacle frame as claimed in claim 8, wherein said clamping device includes a pair of spring blades engaged onto said pair of bridge extensions to force said pair of bridge extensions toward each other.

10. The spectable frame as claimed in claim 9, wherein each of said spring blades includes a projection extended therefrom for engaging with said pair of bridge extensions and for retaining said pair of bridge extensions in said clamping device.

11. The spectacle frame as claimed in claim 9, wherein each of said spring blades includes an outwardly inclined fin extended therefrom for facilitating engagement of said pair of bridge extensions into said clamping device.

* * * * *